(12) United States Patent
Ramcharran (10) Patent No.: US 8,544,100 B2
(45) Date of Patent: Sep. 24, 2013

(54) DETECTING SECURE OR ENCRYPTED TUNNELING IN A COMPUTER NETWORK

(75) Inventor: Ronald Ramcharran, Hackensack, NJ (US)

(73) Assignee: Bank of America Corporation, Charlotte, NC (US)

( * ) Notice: Subject to any disclaimer, the term of this patent is extended or adjusted under 35 U.S.C. 154(b) by 269 days.

(21) Appl. No.: 12/829,882

(22) Filed: Jul. 2, 2010

(65) Prior Publication Data

US 2011/0258703 A1   Oct. 20, 2011

Related U.S. Application Data

(60) Provisional application No. 61/325,055, filed on Apr. 16, 2010.

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |

(52) U.S. Cl.
USPC .......................................................... 726/25

(58) Field of Classification Search
USPC ................ 726/1–3, 10, 22–29; 713/150–181
See application file for complete search history.

(56) References Cited

U.S. PATENT DOCUMENTS

| | | | |
|---|---|---|---|
| 5,623,600 | A | 4/1997 | Ji et al. |
| 7,278,019 | B2 | 10/2007 | Norman |
| 7,340,438 | B2 | 3/2008 | Nordman et al. |
| 7,418,733 | B2 | 8/2008 | Connary et al. |
| 7,457,965 | B2 | 11/2008 | Tamura et al. |
| 7,509,680 | B1 | 3/2009 | Sallam |
| 7,546,334 | B2 | 6/2009 | Redlich et al. |
| 7,739,211 | B2 | 6/2010 | Coffman et al. |
| 2003/0145228 | A1 | 7/2003 | Suuronen et al. |

(Continued)

FOREIGN PATENT DOCUMENTS

| | | |
|---|---|---|
| EP | 1335559 A2 | 8/2003 |
| GB | 2436161 A | 9/2007 |

OTHER PUBLICATIONS

International Search Report and Written Opinion issued in corresponding International Application No. PCT/US11/32515, dated Jun. 27, 2011.

(Continued)

Primary Examiner — Michael S McNally
Assistant Examiner — Trong Nguyen
(74) Attorney, Agent, or Firm — Banner & Witcoff, Ltd.; Michael A. Springs (57) ABSTRACT

Aspects of the present disclosure relate to a computer assisted method for detecting encrypted tunneling or proxy avoidance which may include electronically receiving information from a proxy server, extracting information regarding a CONNECT function of Hyper Text Transport Protocol (HTTP) from the electronically received information, determining at least one destination to which the extracted information regarding the CONNECT function of HTTP corresponds and attempting to negotiate a standard HTTPS session with each of the at least one destination. Further, the computer assisted method may further include, for each of the at least one destination, determining whether the destination is hosting an encrypted tunneling or proxy avoidance application, wherein such a determining may be based on characteristics of an Secure Socket Layer (SSL) certificate associated with the destination or a response received from the destination over a TCP/IP connection.

17 Claims, 10 Drawing Sheets

(56) References Cited

U.S. PATENT DOCUMENTS

| | | |
|---|---|---|
| 2003/0191957 A1 | 10/2003 | Hypponen et al. |
| 2004/0044912 A1 | 3/2004 | Connary et al. |
| 2004/0153650 A1 | 8/2004 | Hillmer |
| 2005/0050334 A1 | 3/2005 | Liang et al. |
| 2005/0086526 A1 | 4/2005 | Aguirre |
| 2005/0183143 A1 | 8/2005 | Anderholm et al. |
| 2005/0188221 A1 | 8/2005 | Motsinger et al. |
| 2005/0188423 A1 | 8/2005 | Motsinger et al. |
| 2005/0273851 A1 | 12/2005 | Raju Datla et al. |
| 2006/0041505 A1 | 2/2006 | Enyart |
| 2006/0064740 A1 | 3/2006 | Kelley et al. |
| 2006/0178918 A1 | 8/2006 | Mikurak |
| 2007/0143851 A1 | 6/2007 | Nicodemus et al. |
| 2007/0169194 A1 | 7/2007 | Church et al. |
| 2007/0180510 A1* | 8/2007 | Long et al. .................. 726/10 |
| 2007/0204345 A1 | 8/2007 | Pereira et al. |
| 2007/0245420 A1 | 10/2007 | Yong et al. |
| 2007/0268880 A1 | 11/2007 | Bellur et al. |
| 2008/0034424 A1 | 2/2008 | Overcash et al. |
| 2008/0082348 A1 | 4/2008 | Paulus et al. |
| 2008/0162385 A1 | 7/2008 | Madani et al. |
| 2008/0181213 A1 | 7/2008 | Ovsiannikov et al. |
| 2008/0198231 A1 | 8/2008 | Ozdemir et al. |
| 2008/0222734 A1 | 9/2008 | Redlich et al. |
| 2008/0244034 A1 | 10/2008 | Shannon et al. |
| 2008/0250484 A1 | 10/2008 | Chong et al. |
| 2008/0271143 A1 | 10/2008 | Stephens et al. |
| 2008/0282339 A1 | 11/2008 | Nakae et al. |
| 2009/0037997 A1 | 2/2009 | Agbabian et al. |
| 2009/0044005 A1* | 2/2009 | Komura et al. ............... 713/150 |
| 2009/0077666 A1 | 3/2009 | Chen et al. |
| 2009/0132813 A1 | 5/2009 | Schibuk |
| 2009/0178139 A1 | 7/2009 | Stute et al. |
| 2009/0178144 A1 | 7/2009 | Redlich et al. |
| 2009/0198765 A1 | 8/2009 | Stamos et al. |
| 2009/0207740 A1 | 8/2009 | Crotti et al. |
| 2009/0241188 A1* | 9/2009 | Komura .......................... 726/22 |
| 2009/0249131 A1 | 10/2009 | Mitomo |
| 2009/0254572 A1 | 10/2009 | Redlich et al. |
| 2009/0271863 A1 | 10/2009 | Govindavajhala et al. |
| 2009/0328209 A1 | 12/2009 | Nachenberg |
| 2010/0065039 A1 | 3/2010 | Chang et al. |
| 2010/0212010 A1 | 8/2010 | Stringer et al. |
| 2010/0281543 A1 | 11/2010 | Golomb et al. |
| 2011/0202969 A1 | 8/2011 | Warn et al. |
| 2011/0225650 A1 | 9/2011 | Margolies et al. |

OTHER PUBLICATIONS

International Search Report and Written Opinion issued in related International Patent Application No. PCT/US11/21149, dated Oct. 26, 2011.

International Search Report and Written Opinion issued in related International Patent Application No. PCT/US11/21152, dated Nov. 1, 2011.

* cited by examiner

DETECTING SECURE OR ENCRYPTED TUNNELING IN A COMPUTER NETWORK

CROSS REFERENCE TO RELATED APPLICATIONS

This application claims priority to co-pending provisional application Ser. No. 61/325,055 filed Apr. 16, 2010 and entitled "Detecting Secure of Encrypted Tunneling in a Computer Network", the contents of which are incorporated herein by reference in their entirety. Further, this application relates to U.S. patent application Ser. No. 12/694,067, filed Jan. 26, 2010 and entitled "Insider Threat Correlation Tool," and U.S. patent application Ser. No. 12/694,075, filed Jan. 26, 2010 and entitled "Insider Threat Correlation Tool," the contents of which are incorporated herein by reference.

FIELD OF DISCLOSURE

Aspects of the present disclosure relate to computer systems and networks. Particular aspects of the present disclosure relate to securing and protecting the integrity of computer systems and networks.

BACKGROUND

In today's information age, protecting the security of information or data in computer systems or networks can be challenging. Intrusion Detection Systems (IDSs) and Intrusion Prevention Systems (IPSs) are commonly implemented in order to protect the security of information or data in computer systems or networks. IDSs and IPSs monitor network or system activity, and indentify, report, and/or attempt to prevent malicious or suspicious activities. However, conventional systems for securing the computer systems and networks still have vulnerabilities. For example, conventional systems for securing the computer systems and networks may still be vulnerable to internal threats, such as tunneling.

Tunneling is a when a first network protocol is encapsulated inside a second protocol. For example, a Secure Shell (SSH) tunnel is when an encrypted tunnel is created through an SSH protocol connection. In order to create an SSH tunnel, a user may configure her computer to forward a specific local port to a port on a remote machine. Once the SSH tunnel has been created, the user may connect to the specific local port to access the service on the remote network.

Tunneling provides a means for a user to circumvent security features an organization may have configured for a computer system or network that the organization is controlling. For example, by tunneling a user can prevent communications the user sends to and receives from the Internet (e.g., the user's web session or web traffic), from being controlled, monitored, or even visible to others, including the organization controlling the system or network from which the user is running her computer. Therefore, it is understood that tunneling creates a high risk scenario for the organization. For example, by creating a tunnel, a user may access restricted content that the organization has restricted the user from accessing. Further, by creating a tunnel, a user may transmit or otherwise disseminate confidential information, such as confidential information about the organization or their customers, with the organization being unaware of the transmission or dissemination.

Therefore, it would be beneficial to be able to detect and analyze tunneling (e.g., encrypted tunneling) in order to proactively address possible data leaks and other potentially detrimental behavior to the organization. Hence, it would be advantageous to have a system and method which detects tunneling (e.g., encrypted tunneling) in a computer system or network. Further, it would be advantageous to have a system and method which detects and analyzes tunneling (e.g., encrypted tunneling) in a system or computer network.

SUMMARY

Aspects of the present disclosure relate to a computer assisted method for detecting encrypted tunneling or proxy avoidance which may include electronically receiving information from a proxy server, extracting information regarding a CONNECT function of Hyper Text Transport Protocol (HTTP) from the electronically received information, determining at least one destination to which the extracted information regarding the CONNECT function of HTTP corresponds and attempting to negotiate a standard HTTPS session with each of the at least one destination. Further, the computer assisted method may further include, for each of the at least one destination, determining whether the destination is hosting an encrypted tunneling or proxy avoidance application, wherein such a determining may be based on characteristics of an Secure Socket Layer (SSL) certificate associated with the destination or a response received from the destination over a TCP/IP connection.

Further aspects of the present disclosure relate to an encrypted tunneling detecting apparatus which may include at least one processor; and at least one memory storing computer executable instructions that cause the at least one processor to perform a method for detecting encrypted tunneling. The method may include electronically receiving information from a proxy server, extracting information regarding a CONNECT function of HTTP from the electronically received information, determining at least one destination to which the extracted information regarding the CONNECT function of HTTP correspond and attempting to negotiate a standard HTTPS session with each of the at least one destination. Further, the method may also include, for each of the at least one destination, determining if a SSL certificate associated with the destination has been issued by a trusted certificate authority and determining whether the destination is hosting an encrypted tunneling application, wherein the determining may be based on characteristics of the SSL certificate or a response received from the destination over a TCP/IP connection.

Additional aspects of the present disclosure relate to a computer assisted method for detecting encrypted tunneling which may include electronically receiving information from a proxy server, extracting information regarding a CONNECT function of HTTP from the electronically received information, determining at least one destination to which the extracted information regarding the CONNECT function of HTTP corresponds and attempting to negotiate a standard HTTPS session with each of the at least one destination. Further, the method may also include, for each of the at least one destination, determining if a SSL certificate associated with the destination has been issued by a trusted certificate authority and determining whether the destination is hosting an encrypted tunneling application, wherein the determining may be based on characteristics of the SSL certificate or a response received from the destination over a TCP/IP connection.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
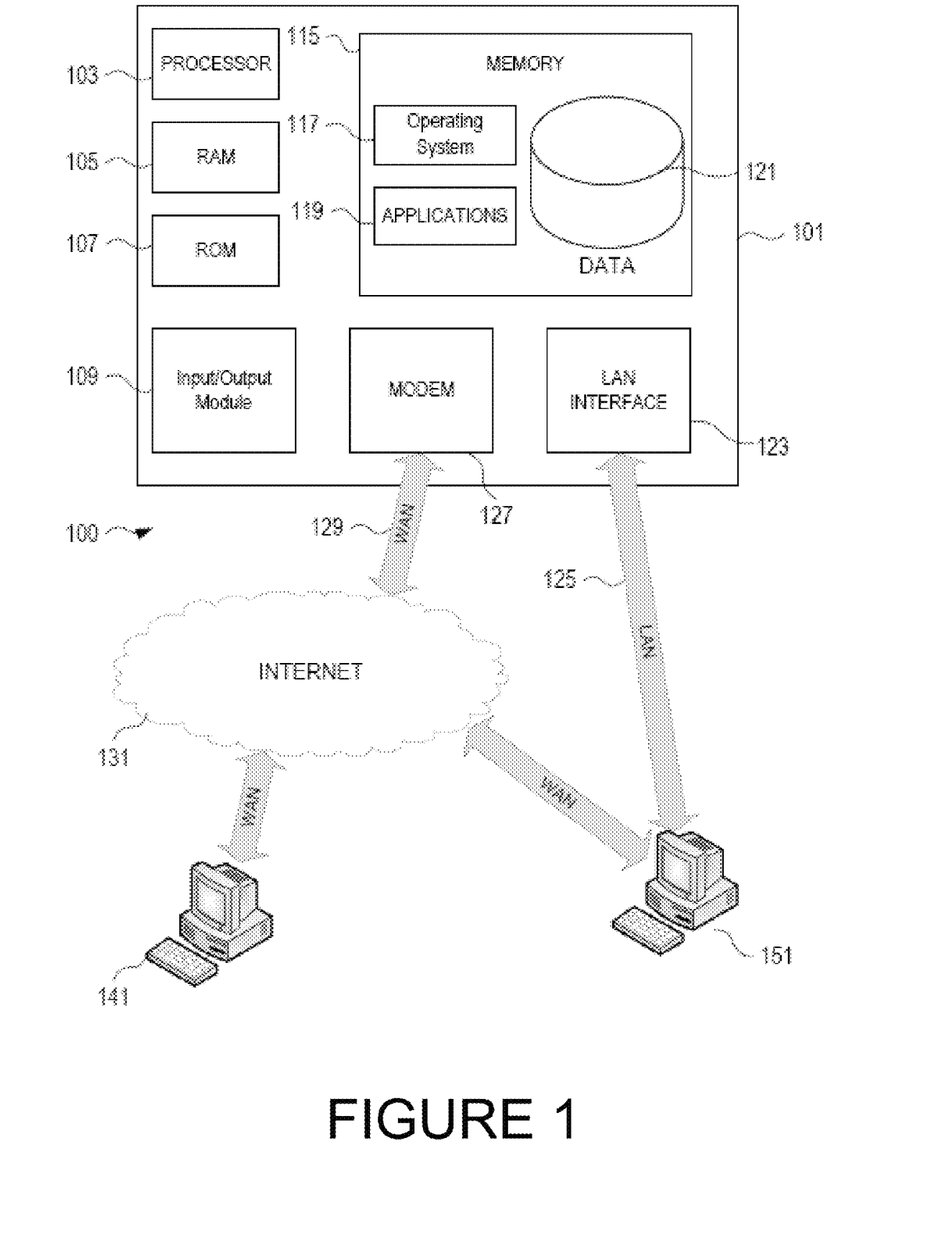
FIG. 1 illustrates a diagram of a general-purpose digital computing environment in which certain aspects of the present disclosure may be implemented.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

Aspects of the disclosure are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the disclosure may be described in the general context of computer-executable instructions, such as program modules, being executed by a computer. Generally, program modules include routines, programs, objects, components, data structures, and the like that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computer 101 having a processor 103 for controlling overall operation of the computer 101 and its associated components, including RAM 105, ROM 107, input/output module 109, and memory 115. Computer 101 typically includes a variety of computer readable media. Computer readable media may be any available media that may be accessed by computer 101 and include both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 101. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although not shown, RAM 105 may include one or more are applications representing the application data stored in RAM memory 105 while the computer is on and corresponding software applications (e.g., software tasks), are running on the computer 101.

Input/output module 109 may include a microphone, keypad, touch screen, and/or stylus through which a user of computer 101 may provide input, and may also include one or more of a speaker for providing audio output and a video display device for providing textual, audiovisual and/or graphical output. Software may be stored within memory 115 and/or storage to provide instructions to processor 103 for enabling computer 101 to perform various functions. For example, memory 115 may store software used by the computer 101, such as an operating system 117, application programs 119, and an associated database 121. Alternatively, some or all of computer 101's computer executable instructions may be embodied in hardware or firmware (not shown). As described in detail below, the database 121 may provide centralized storage of account information and account holder information for the entire business, allowing interoperability between different elements of the business residing at different physical locations.

Computer 101 may operate in a networked environment supporting connections to one or more remote computers, such as branch terminals 141 and 151. The branch computers 141 and 151 may be personal computers or servers that include many or all of the elements described above relative to the computer 101. The network connections depicted in FIG. 1 include a local area network (LAN) 125 and a wide area network (WAN) 129, but may also include other networks. When used in a LAN networking environment, computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Terminals 141 or 151 may also be mobile terminals including various other components, such as a battery, speaker, and antennas (not shown). Input/output module 109 may include a user interface including such physical components as a voice interface, one or more arrow keys, joystick, data glove, mouse, roller ball, touch screen, or the like.

It is noted that throughout the disclosure, the term organization may be used interchangeably with the terms: bank, financial institution, company, business, entity, and the like. The term organization is not intended to be limiting, but instead merely describes a single potential embodiment according to aspects of the disclosure. Further, it is noted that throughout the disclosure, the term employee may be used interchangeably with the terms: associate, user, and the like. The term employee is not intended to be limiting, but instead merely describes a single potential embodiment according to aspects of the disclosure.

As described above, an organization such as a bank, financial institution, business, and the like may provide its employees with access to the Internet, aka, the World Wide Web (web). For example, for some organizations, their employees may need access to resources, such as the Internet in order to conduct their duties as employees. Further, some organizations may wish to provide access to the Internet as a convenience or benefit for their employees. Therefore, the organizations may provide employees with access to one of the organization's computers in order for the employees to connect to the Internet.

Figure 2:
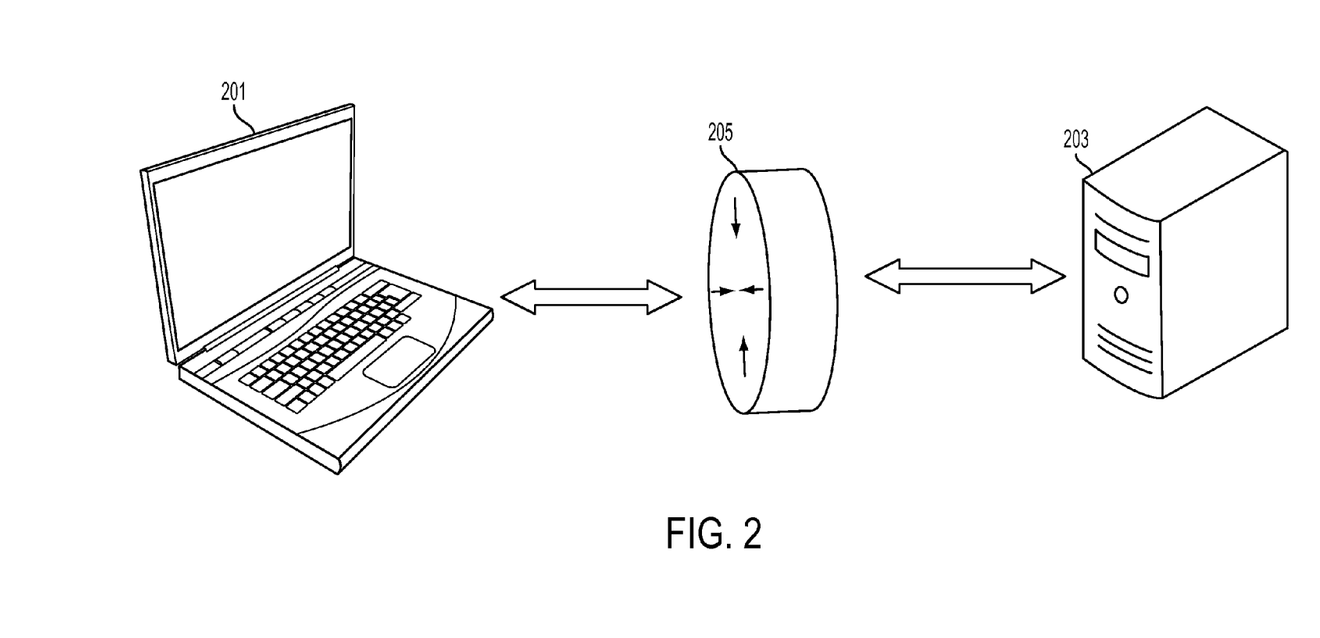
FIG. 2 is a diagram which schematically shows a network connection to the Internet through a proxy.

For example, typically in such an environment describe above, an organization will provide access to the Internet via a proxy, such as a proxy server. A proxy server is a server that acts as an intermediary for requests from users attempting to access resources from other servers. For example, in the situation described above, employees of the organization may use a computer to access the Internet via a proxy server. FIG. 2 is a diagram which illustrates such a connection between a computer and the Internet. As seen in FIG. 2, an employee's computer 201 accesses the Internet 203 via a proxy server 205.

An organization may implement a proxy server configuration, such as described above, in order to take advantage of features a proxy server may provide in terms of maintaining control over the organization's computer system or network. For example, a proxy server may be configured to provide the ability to determine and log employees' Internet usage. For example, the proxy server may be configured to provide records, or logs, which show various aspects of Internet usage, including how often employees are connecting to the Internet, how long the Internet sessions last, and the like. Therefore, by leveraging the logs of the proxy server, an organization has the ability to monitor various aspects of the Internet sessions of the employees.

Further, a proxy server may be configured to restrict access to particular services or content. For example, an organization may wish to restrict employees from accessing particular websites (e.g., websites which the organization deems inappropriate for the employee to be accessing over an organization's computer, such as websites with pornographic material, fantasy sports websites, personal email websites, and the like. Therefore, the proxy server may be configured to prevent employees' computers from accessing a respective web server if the user attempts to connect to a restricted website.

Hence, based on the above examples, it is understood that an organization may implement a proxy server configuration, such as described above, in order to enhance control over the organization's computer system or network. However, as discussed above, available technology may allow employees to circumvent the controls and restrictions that the proxy server provides the organization. For example, as mentioned above, technology exists that allows a user to create and use a tunnel (e.g., a SSH tunnel) through an organization's computer system or network. As discussed above, by tunneling through the organization's computer system or network, employees may bypass controls and restrictions that the proxy server has been configured to implement.

It is noted that establishing a tunnel (e.g., a SSH tunnel) may be relatively easy for an employee to accomplish. For example, there are multiple software applications which may configure a user's computer to create a tunnel, which, thereby, allows the user to transmit data or allows the user to access blocked content. Such software applications are currently available on the Internet and a user may freely and quickly download and install them on her computer.

Figure 3:
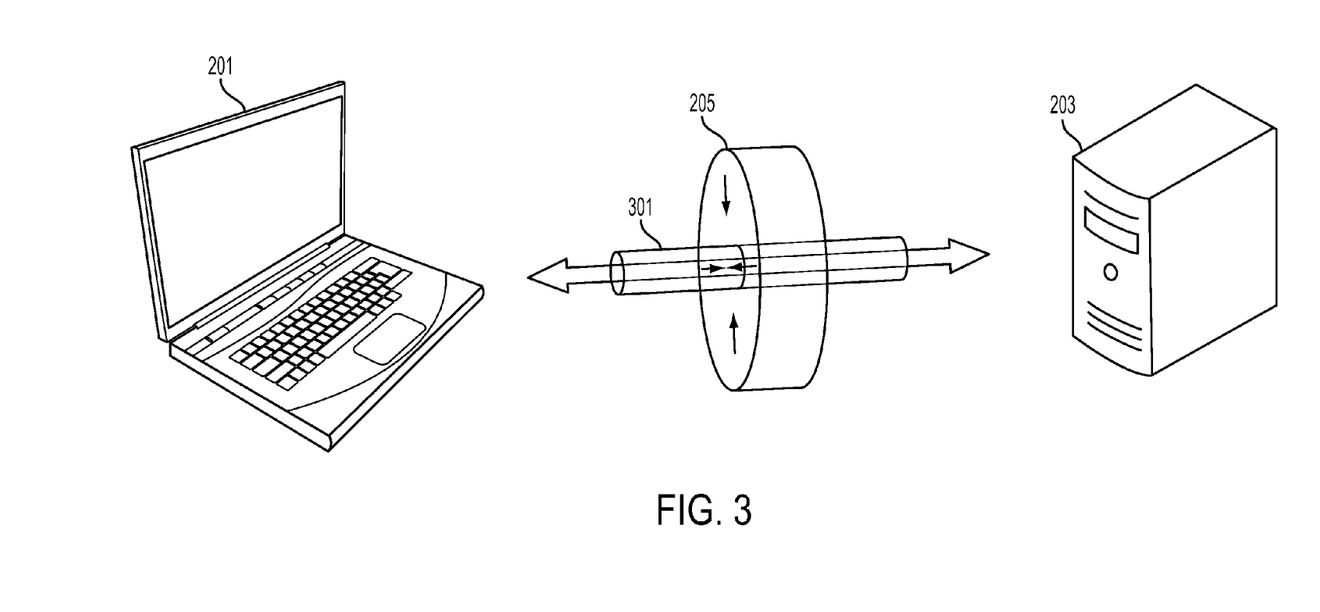
FIG. 3 is a diagram which schematically shows a tunnel through the proxy shown in FIG. 2.

FIG. 3 is a diagram which schematically illustrates the concept of a tunnel through the proxy server shown in FIG. 2. As seen in FIG. 3, the user's computer 201 accesses the Internet 203 via a tunnel 301 instead of the proxy service 205.

It is noted that a tunnel can be thought of as a tool which may shift control for Internet usage outside of an organization's control. Once the tunnel is created, an employee is able to bypass any controls or limitations that the organization has established via the proxy server. Further, as the employee is no longer using the proxy server, the organization may lose visibility of where and how an employee accesses the Internet.

An employee may create and implement a tunnel to bypass the controls and restrictions of the proxy server for a variety of reasons. For example, the employee may be attempting to access websites which have been blocked by the organization. Alternatively, or additionally, an employee may have a malicious intent. For example, the associate may intend to breach security and disseminate confidential company information. Therefore, as can be understood based on the above examples, regardless of the employee's intention for creating and using a tunnel through the system or network, it would be advantageous for an organization to detect the encrypted tunneling activity as soon as possible.

Therefore, aspects of the disclosure relate to detecting and analyzing encrypted tunneling activity. Further, aspects of the disclosure related to detecting encrypted tunneling activity in near real time.

Typically, in a situation such as described above, where a user is browsing the Internet via a web browser, the user is using Hyper Text Transport Protocol (HTTP). HTTP is an Application Layer protocol for distributed, collaborative, hypermedia information systems. HTTP may be transmitted via PORT 80 (Transmission Control Protocol, or TCP). HTTP includes eight functions which indicate the desired action to be performed on an identified resource (e.g., a web server). For example, the "CONNECT" function, which will be described below, is one of the functions of HTTP.

It is noted that HTTP is not secure. In other words, another person or entity can monitor on the exchange between the user's computer and the web server with which it is communicating during the Internet session. Secure Socket Layer (SSL) is a protocol for managing the security of a message transmission over the Internet. For example, SSL, and more recently, Transport Layer Security (TLS) (which is based on SSL), are cryptographic protocols that provide security over communications over networks such as the Internet. HTTP over SSL (HTTPS) is a Web protocol that encrypts and decrypts user page requests as well as the pages that are returned by the Web Server. Hence, when an employee is using HTTPS to communicate with the Internet, the communications are secure. Therefore, in an environment in which a proxy server is implemented, all requests and replies over HTTPS are not visible at the proxy server. Instead, only the web session itself is logged.

It is noted, that there may be benefits for employees to have access to such secure communications. For example, employees may need to send confidential information over the Internet. However, since HTTPS is secure and any requests and replies are neither visible to nor logged by the organization, even "normal" or "standard" HTTPS traffic (e.g., non malicious traffic) may be considered by the organization to have a potential risk.

At a basic level HTTPS may be used to establish a communication channel directly between a user's web browser and the web server with which it is communicating. In an environment, such as discussed above, where a proxy server is employed, the proxy server connects the session between the user and the proxy server and the proxy server and the web server using the "CONNECT" function of HTTP.

However, the "CONNECT" function of HTTP may be used in other ways as well. For example, the "CONNECT" function of HTTP may be used to convert a request connection into a TCP/IP tunnel usually to facilitate HTTPS through a proxy server. For example, the "CONNECT" function of HTTP may be used to connect to any proxy aware application, including those applications used to create an encrypted tunnel (e.g., an SSH tunnel) in order to tunnel out of a network.

Hence, it is understood that both tunneling and "standard" HTTPS may employ the "CONNECT" function of HTTP. The logs of the proxy server will identify any "CONNECT" function of HTTP generated on the network. However, as discussed above, the logs will not provide further detailed information regarding the session, such as requests and replies. In the case of the "standard" HTTPS traffic, the traffic is encrypted and not visible to the proxy server and in the case of the tunnel, the traffic is bypassing the proxy server. Therefore, due to the limited information available from the logs of the proxy server with respect the "CONNECT" function, it may be difficult to distinguish between "standard" HTTPS and tunneling application traffic in the proxy logs.

However, aspects of the disclosure relate to a method and system which detect non-"standard" HTTPS traffic using information from the proxy logs. By determining such non-"standard" HTTPS traffic, the method and system have the ability to identify encrypted tunneling.

FIGS. 4-8 are flow charts which illustrate a method for determining such non-"standard" HTTPS traffic and detecting encrypted tunnels according to aspects of the disclosure. According to aspects of the disclosure the method may be performed autonomously by a computer or manually via a computer assisted method.

Figure 4:
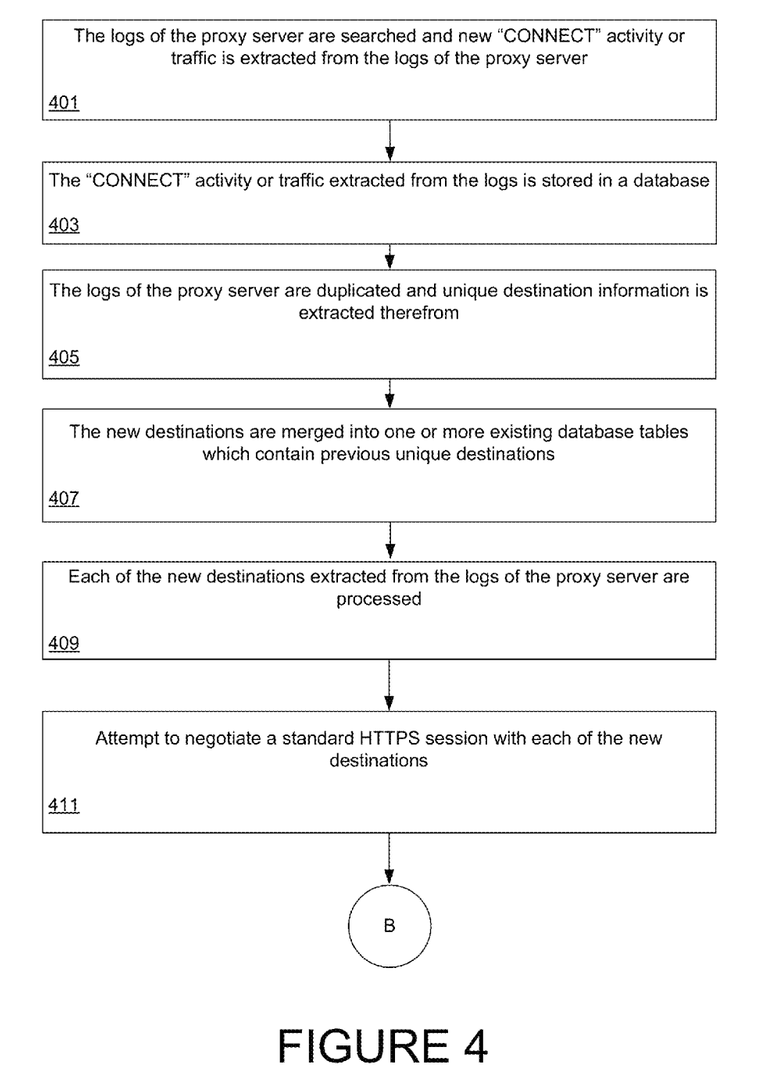
FIGS. 4, 5, 6, 7 and 8 show flow charts of illustrative examples of methods for detecting and analyzing encrypted tunneling according to aspects of the present disclosure.

As seen in step 401, initially, the logs of the proxy (e.g., the proxy server) may be searched and new "CONNECT" function activity may be extracted from the logs. According to aspects of the disclosure, new "CONNECT" activity may be extracted from the logs of the proxy in real time or almost real time (e.g., virtually immediately after the new "CONNECT" activity occurs). For example, according to aspects of the disclosure, a process may update every time the logs roll from the proxy servers. This allows analysts to monitor activity almost as soon as it happens. According to other aspects of the disclosure, new "CONNECT" activity may be extracted from the logs of the proxy at a predetermined interval (e.g., hourly).

In step 403, the new "CONNECT" activity extracted from the logs may be stored in a database. In step 405, the logs may contain multiple entries for each destination and unique destination information may be extracted therefrom. It is noted that according to aspects of the disclosure, destination information may be an IP address in combination with a port number.

In step 407, the new destinations may be merged into one or more existing database tables which contain previous unique destinations. In step 409, each new destination may be processed. For example, as seen in step 411, according to aspects of the disclosure, the process may include attempting to negotiate a standard HTTPS session with each of the new destinations.

If a standard HTTPS session is able to be negotiated with a new destination, then in step 413, according to aspects of the disclosure, the process may include determining whether an SSL certificate associated with the respective destination is issued by a trusted Certificate Authority.

If the SSL certificate associated with the respective destination is issued by a trusted Certificate Authority, then in steps 415 and 417, the destination is determined to be valid. Further, as seen in step 419, the destination may be recorded as such in a database. Further, according to aspects the disclosure, it may determined that the destination does not need to be processed again. Therefore, as seen in step 421, a destination retry flag associated with the destination may be set to "no". Additionally, in step 423, the process may end or the system executing the process may exit the process for this destination.

Figure 5:
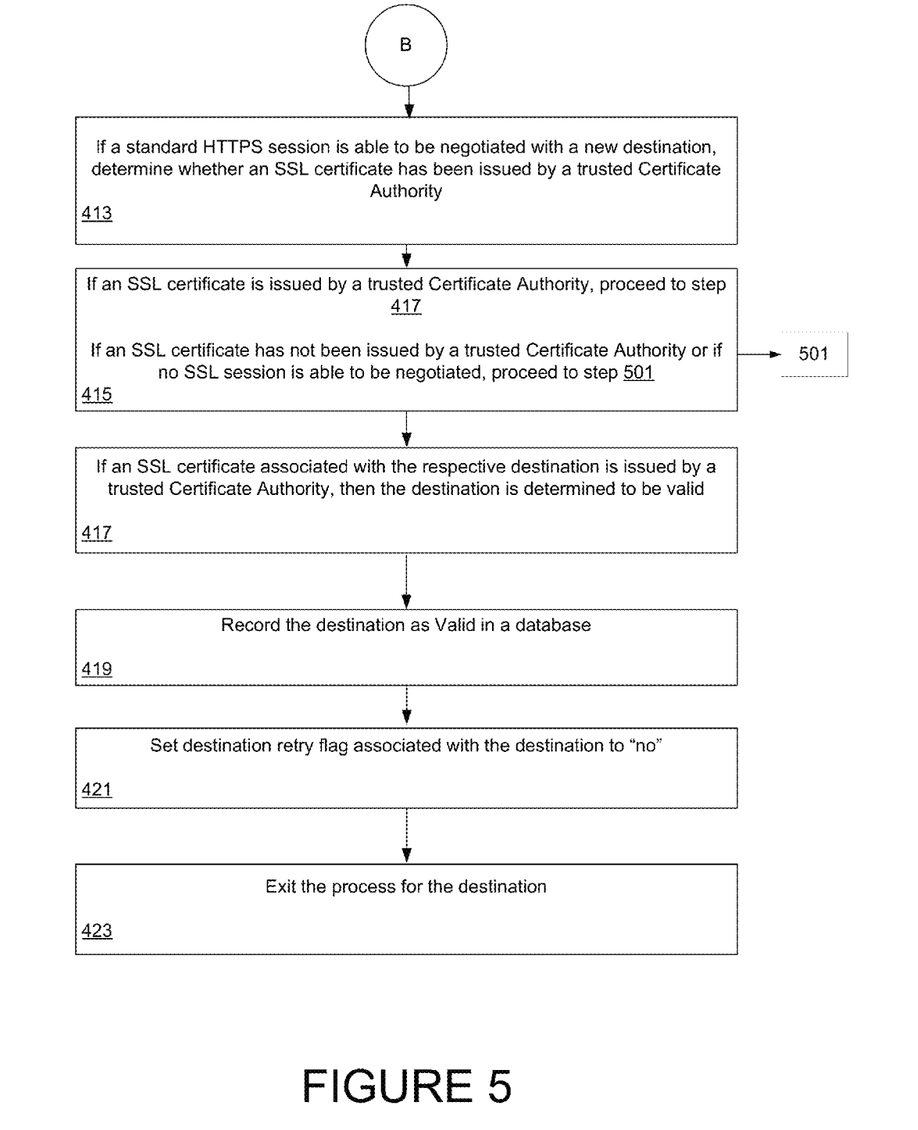

If, in step 415, it is determined that the SSL certificate associated with the respective destination is issued by someone other than a trusted Certificate Authority (e.g., the SSL certificate is self signed) or if no SSL session is able to be negotiated, then the process proceeds to step 501 wherein the destination is determined to be invalid. Further, as seen in step 503, the destination may be recorded as such in a database.

In step 505, it is determined if the destination web server is hosting a known tunneling/proxy avoidance application. According to aspects of the disclosure, this determination may be aided by using details from the web server and SSL certificate collected during the SSL session negotiation.

For example, according to aspects of the disclosure, information from the SSL certificate may be used to determine if the destination is hosting a known tunneling/proxy avoidance application. For example, if a SSL certificate is self signed, then there may be an increased probability that the destination may be hosting a known tunneling/proxy avoidance application.

According to other aspects of the disclosure, regardless of whether an SSL certificate is self signed, an SSL certificate may be examined to determine if it is legitimate. For example, destinations which host tunneling/proxy avoidance applications may generate fake SSL certificates. These fake SSL certificates may contain characteristics which identify the destinations they are associated with as hosting tunneling/proxy avoidance applications. For example, in a fake SSL certificate, the name of: to whom that SSL certificate was issued, who issued the SSL certificate, the name of the website the which the SSL certificate is supposed to be associated with may all contain characteristics which identify the SSL certificate as a fake and, thereby, identify the associated destination as likely hosting a tunneling/proxy avoidance application. For example, the fake SSL certificate may list the name of the website that the SSL certificate is supposed to be associated with as www.*.net wherein, * is a random string of characters that are unintelligible. Hence, by examining the fake SSL certificate, it is clear that such a destination is likely hosting a tunneling/proxy avoidance application. Further, the particular aspects of the SSL characteristics, such as the example given above, may identify which particular type of tunneling/proxy avoidance application is associated with that destination.

Therefore, according to aspects of the disclosure, this process of examining characteristics of the SSL certificate may be may be done automatically by a computer which compares the characteristics of the SSL certificate with a list of those respective authentic characteristics in order to determine whether the SSL certificate is authentic. For example, the name of the website on the SSL certificate may be compared with a predetermined list of names of authentic websites in order to determine if the name of the website on the SSL certificate is legitimate. In this way, it may be determined whether the SSL certificate is fake and the destination is likely hosting a tunneling/proxy avoidance application.

If it is determined that the destination is hosting a known tunneling/proxy avoidance application, then in step 509, a notification is generated. For example, according to aspects of the disclosure, an email alert or other communication may be generated and forward to a respective party (e.g., security team). Further, according to aspects of the disclosure, in step 511, all "CONNECT" traffic from the database for each unique user is extracted and such data is stored in a new table or database. Further, according to aspects the disclosure, it may determined that the destination does not need to be processed again. Therefore, as seen in step 513, a destination retry flag associated with the destination may be set to "no". Additionally, in step 515, the process may end or the system executing the process may exit the process for this destination.

Figure 6:
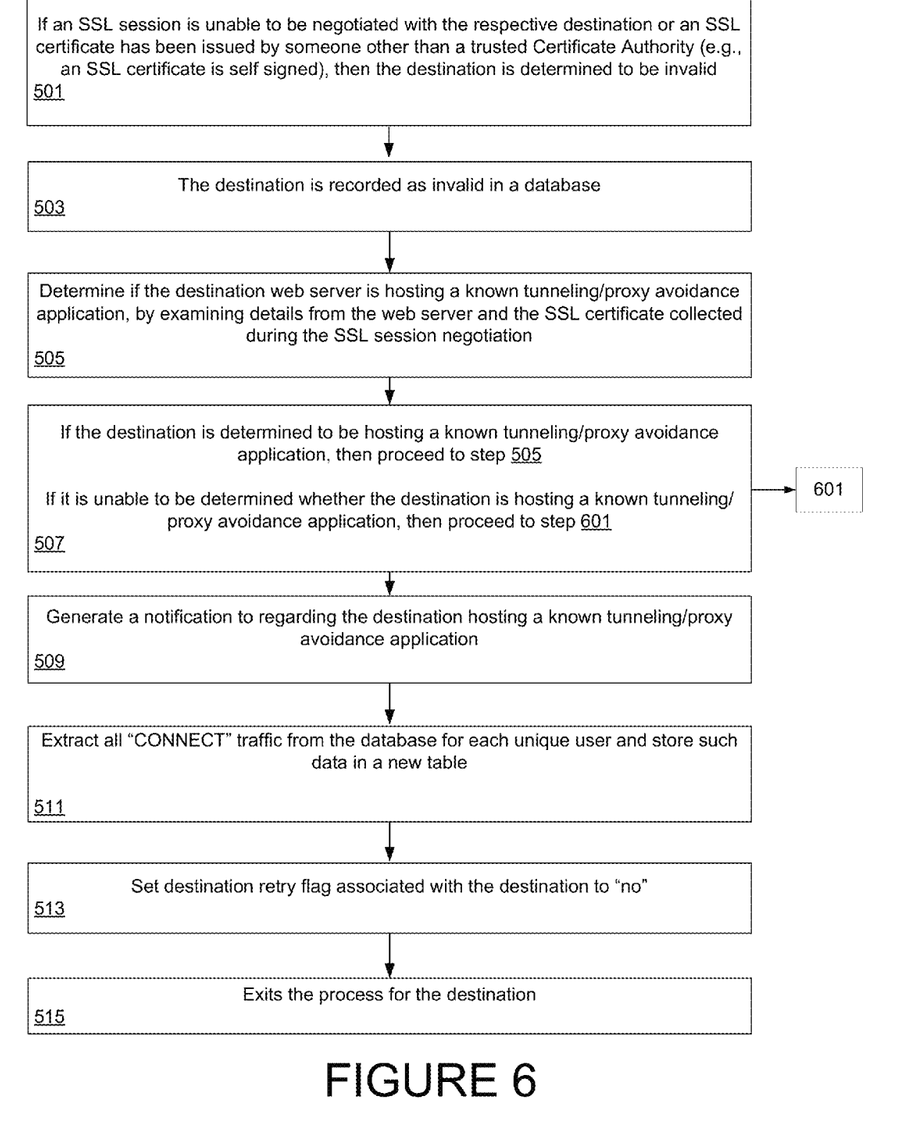

Alternatively, if, in step 505 and 507, it is unable to be determined whether the destination is hosting a known tunneling/proxy avoidance application, then the process proceeds to step 601. In step 601, the process may include attempting to identify the service of the destination using various techniques. For example, according to aspects of the disclosure, the process may include employing the technique of "banner grabbing." Further according to aspects of the disclosure, the process may include employing the technique of service "finger printing."

For example, according to aspects of the disclosure, a connection may be opened with the destination (e.g., to the port). For example, the connection may be made of TCP/IP protocol. Once, the connection is made, the destination may respond with a message, or banner, containing the service at the destination, including the capabilities, the version running, on which operating system its running, and the like. Such a banner may provide information which may identify it as a tunneling/proxy avoidance application. For example, if a connection is opened to such a destination, the destination may respond with a banner such as "SSH-2.0 .." The SSH may serve as an identifier that the destination is hosting a secure shell tunneling application. Hence, the destination would be readily identified as hosting a known tunneling/proxy avoidance application. This process is referred to as banner grabbing.

Further, according to aspects of the disclosure, once a connection is made with the destination as described above, a service finger printing process may be also be used to determine the service provided at that destination. Service finger printing is a process that looks at characteristics of the service, in order to determine the service provided at that destination. For example, characteristics, such as port or channel hopping patterns, length of traffic, or other service profile characteristics are known to those of ordinary skill in the art and may be used to indicate the service provided at that destination.

In step 603, if from these and/or other techniques, it is determined that the destination service is a known tunneling/proxy avoidance application, then in step 605, a notification is generated. For example, according to aspects of the disclosure, an email alert or other communication may be generated and forward to a respective party (e.g., security team). Further, according to aspects of the disclosure, in step 607, all "CONNECT" traffic from the database for each unique user may be extracted and such data may be stored in a new table or database. Further, according to aspects the disclosure, it may determined that the destination does not need processed again. Therefore, as seen in FIG. 609, a destination retry flag associated with the destination may be set to "no". Additionally, in step 611, the process may end or the system executing the process may exit the process for this destination.

Figure 7:
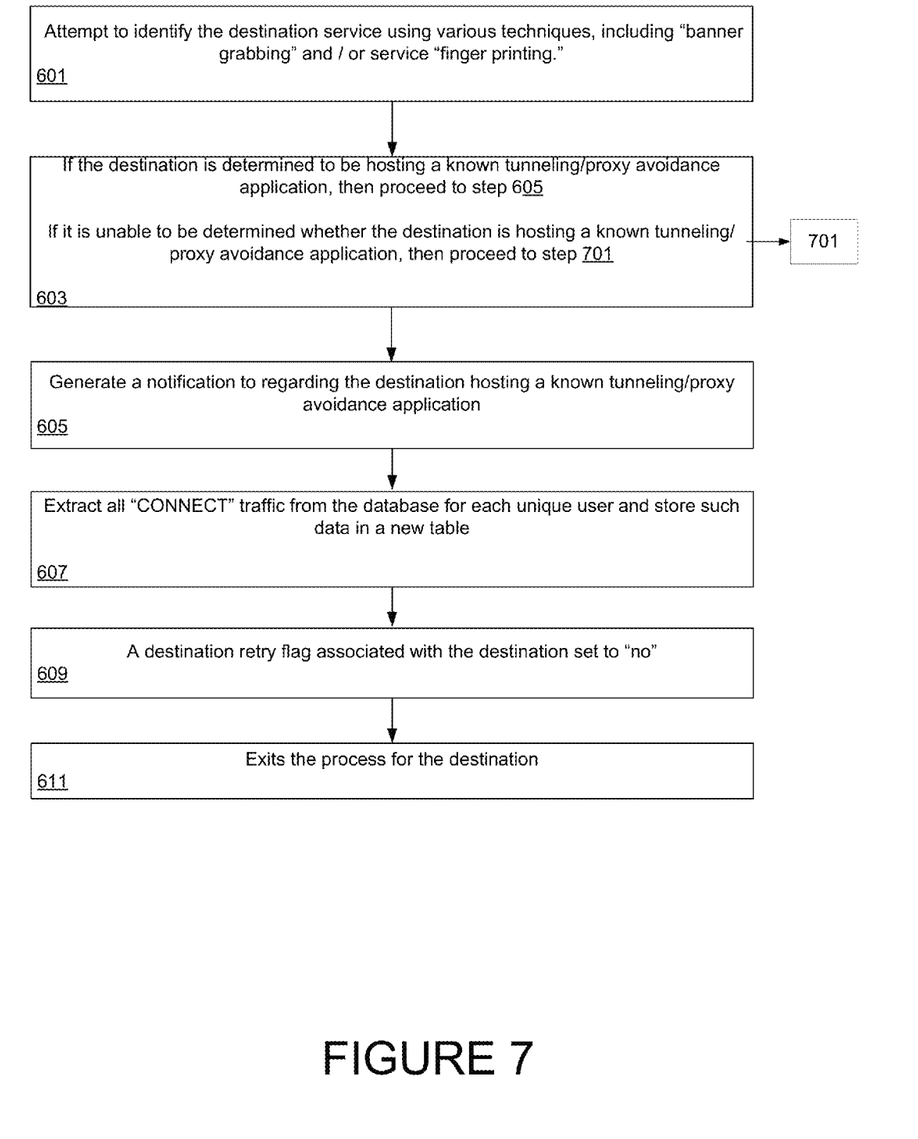
Figure 8:
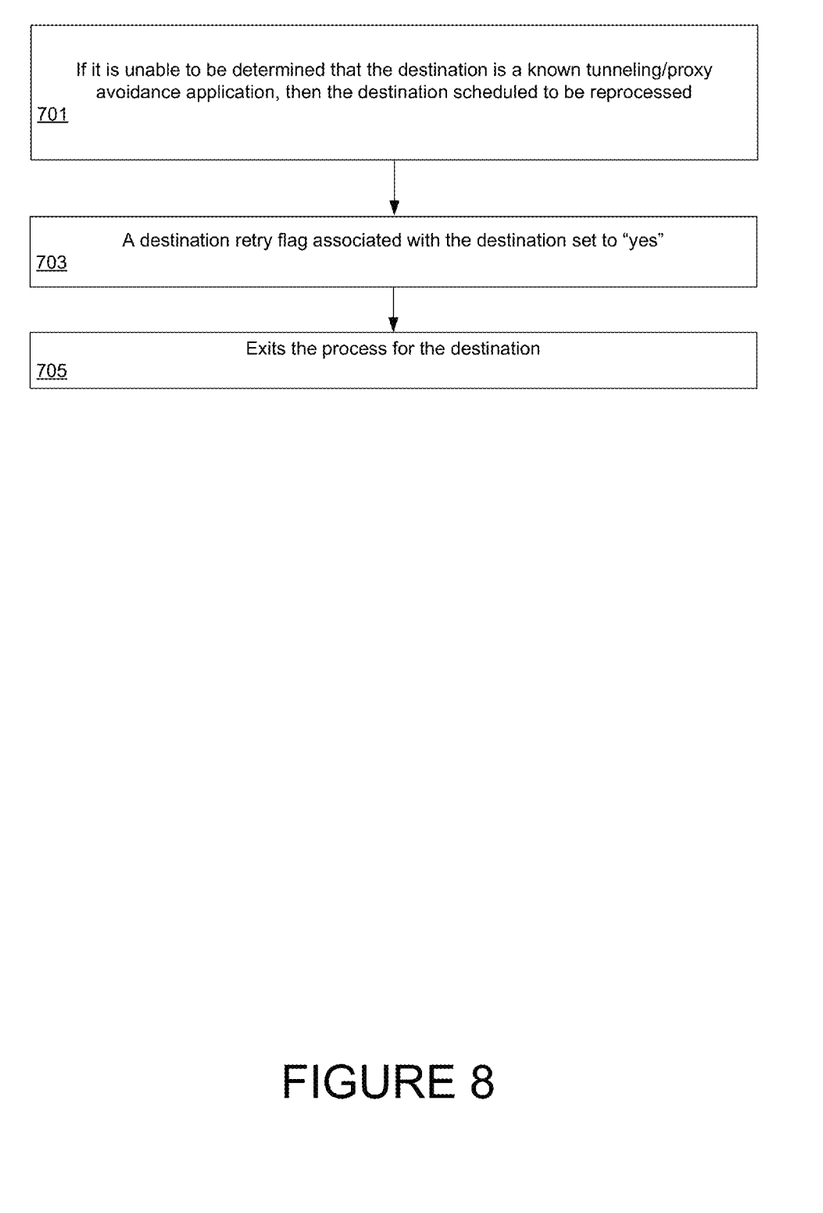

In step 603, if it is unable to be determined that the destination is a known tunneling/proxy avoidance application, then the process may proceed to step 701. In step 701, the destination may be scheduled to be reprocessed. For example, as seen in step 703 a destination retry flag associated with the destination may be set to "yes". Additionally, in step 705, the process may end or the system executing the process may exit the process for this destination. According to aspects of the disclosure, the destination scheduled to be reprocessed (e.g., destinations associated with destination retry flags that are set to "yes"), such reprocessing may occur periodically (e.g., daily).

Figure 9:
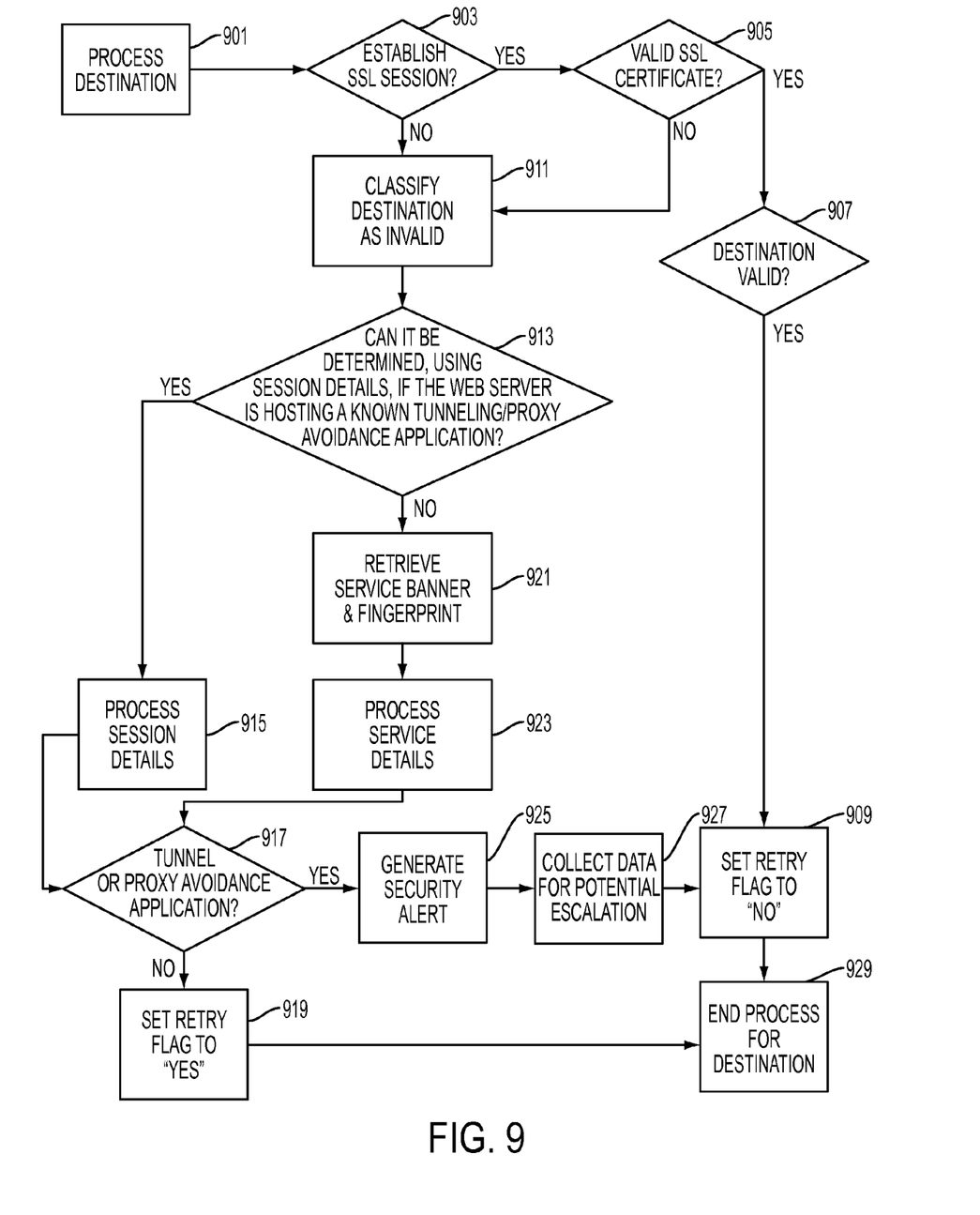
FIG. 9 is a flowchart of an illustrative example of a method for detecting and analyzing encrypted tunneling according to aspects of the present disclosure.

FIG. 9 is a block diagram which illustrates aspects of the present system and method for detecting encrypted tunneling in a computer system or network. The process described in FIG. 9 may be done for each new destination extracted from logs as described above. Further, it is noted that steps or elements of this or any other process may be rearranged, combined, eliminated or otherwise modified as desired to produce a desired result.

As seen in step 901, the system may process the destination. As described above, the destination may be an IP address and port number. Processing the destination may include attempting to establish an SSL session with the destination. For example, in step 903, the system attempts to establish an SSL Session with the destination. If the system is able to establish an SSL session with the destination, then the process proceeds to step 905. In step 905, the system determines whether a SSL Certificate associated with the new destination has been issued by a trusted authority as described above. If the system determines that the SSL Certificate associated with the new destination has been issued by the trusted authority, then the process proceeds to step 907. In step 907, the system determines if the destination is valid. Generally, if the SSL Certificate associated with the new destination has been issued by the trusted authority, the destination is considered as valid. If the system determines that the destination is valid, then the destination may be recorded as a valid destination and may be stored (e.g., stored in database). Then, the process proceeds to step 909. In step 909, a retry flag associated with whether the destination must be processed again is set to "no". Then, the process proceeds to step 929. In step 929, the process is ended for the particular destination.

Alternatively, if, in step 903, the system is unable to establish an SSL session with the destination, then the process proceeds to step 911. In step 911, the destination is classified as invalid and may be recorded as an invalided destination and may be stored (e.g., stored in database). Further, it is noted that, if, in step 905, the system determines that the SSL certificate is invalid, then the process proceeds to step 911. An SSL certificate may be considered invalid if it not signed by a trusted authority (e.g., it is self signed) or if there is not SSL certificate at all.

Once the destination is classified as invalid in step 911, the process proceeds to step 913. In step 913, the system determines whether it can be determined, using session details, whether the web server is hosting a known tunneling or proxy avoidance application. If the system determines that it can use the session details to determine whether the web server is hosting a known tunneling or proxy avoidance application, the process proceeds to step 915. In step 915, the system processes the session details. Processing the session details to determine whether the web server is hosting a known tunneling or proxy avoidance application is done as described in detail above.

In step 917, based on the findings of the session details in step 915, the system determines whether the web server is hosting a known tunneling or proxy avoidance application. If the web server is hosting a known tunneling or proxy avoidance application, then the process proceeds to step 925. In step 925, the system generates a security alert. According to aspects of the disclosure, generating the security alert may include an email alert and forwarding the email to a respective party (e.g., security team). Once the security alert has been generated, the process may proceed to step 927.

In step 927, the system may collect data for potential escalation. According to aspects of the disclosure, collecting data for potential escalation may include extracting all "CONNECT" traffic from the database for each unique user and store such data in a new table. Once the data for potential escalation has been collected, the process may proceed to step 909.

In step 909, a retry flag associated with whether the destination must be processed again is set to "no". Then, the process proceeds to step 929. In step 929, the process is ended for the particular destination.

Alternatively, if, in step 917, based on the findings of the session details in step 915, the system is unable to determine whether the web server is hosting a known tunneling or proxy avoidance application, then the process proceeds to step 919. In step 919, a retry flag associated with whether the destination must be processed again is set to "yes". Then, the process proceeds to step 929. In step 929, the process is ended for the particular destination.

Alternatively, if, in step 913, if the system determines that it is unable to use the session details to determine whether the web server is hosting a known tunneling or proxy avoidance application, the process proceeds to step 921. In step 921, the system retrieves the service banner and fingerprints associated with the new destination as described in detail above. The process then proceeds to step 923. In step 923, the system processes the service details as described in detail above.

The process then proceeds to step 917. In step 917, based on the findings of the service details in step 921 and 923, the system determines whether the service is a known tunneling or proxy avoidance application. If the service is a known tunneling or proxy avoidance application, then the process proceeds to step 925 and follows the procedures described above. Alternatively, if, in step 917, based on the findings of the service details in step 923, the system is unable to determine whether the web server is hosting a known tunneling or proxy avoidance application, then the process proceeds to step 919 and follows the procedures described above.

Figure 10:
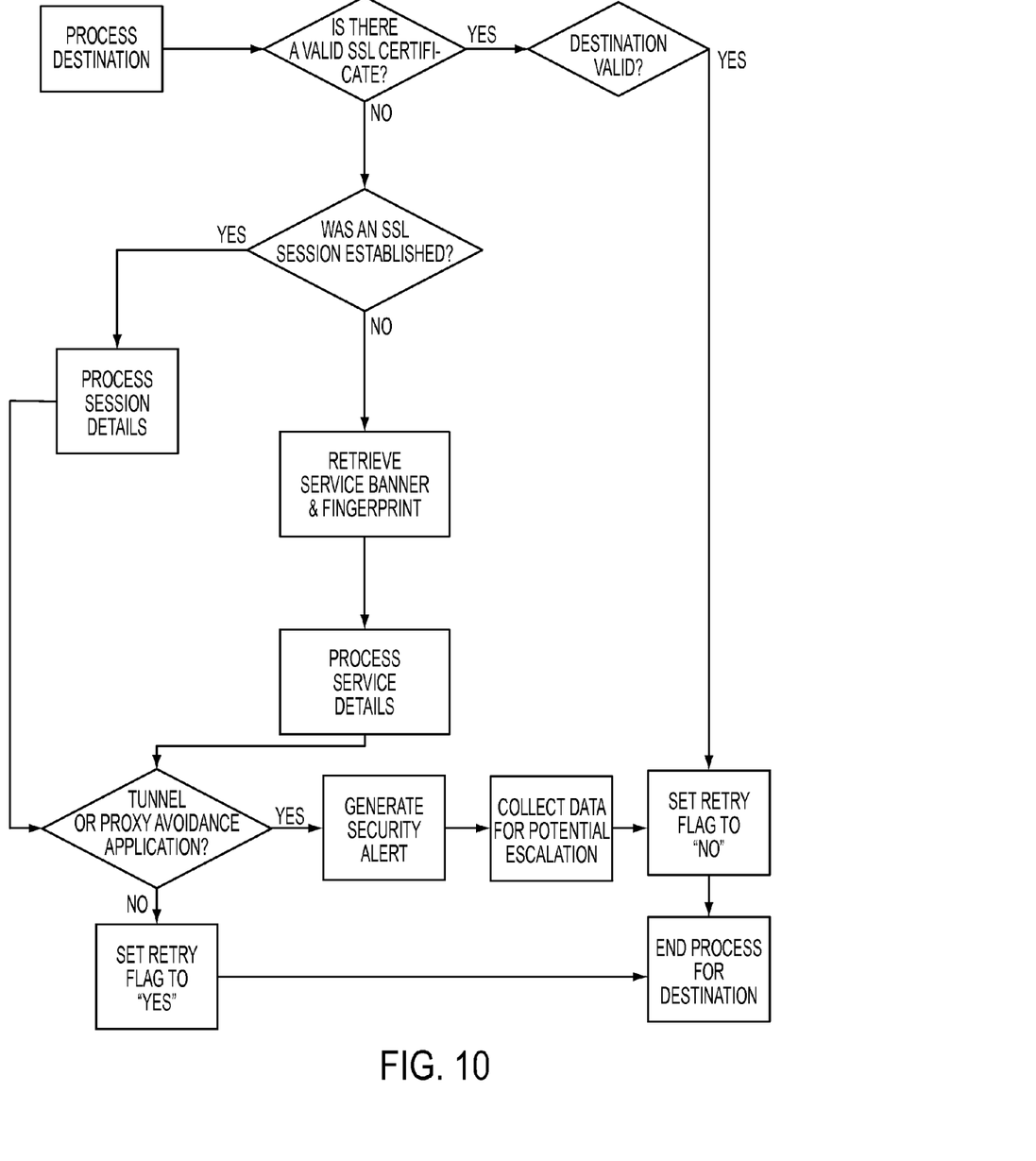
FIG. 10 is a flowchart of an illustrative example of a method for detecting and analyzing encrypted tunneling according to aspects of the present disclosure.

FIG. 10 is a block diagram which illustrates aspects of the present system and method for detecting encrypted tunneling in a computer system or network. The process described in FIG. 10 may be done for each new destination extracted from logs as described above. Further, it is noted that steps or elements of the process may be rearranged, combined, eliminated or otherwise modified as desired to produce a desired result. The steps or elements of the process shown in FIG. 10 are similar to the steps or elements of the process described above and, therefore, for the sake of brevity will not be described in further detail here.

According to aspects of the disclosure, once the secure tunneling traffic is detected, it may be stored. Further, the secure tunneling traffic may be displayed such that it those who view it are able to quickly view hyperlinks, expand and collapse data and navigate from tunneling activity to a Person of Interest's (POI) User Profile. Tunneling activity is captured, organized and available for view in a relatively short time span.

As discussed above, aspects of the above described method and system may relate to U.S. patent application Ser. No. 12/694,075, filed Jan. 26, 2010 and entitled "Insider Threat Correlation Tool," the contents of which are incorporated herein by reference. For example, aspects of the above described method and system may be incorporated into one or more of the features of the disclosure described in U.S. patent application Ser. No. 12/694,075, entitled the "Insider Threat Correlation Tool".

One or more of the features of the disclosure described in U.S. patent application Ser. No. 12/694,075, may produce a Threat Rating which is a result of diverse data feeds and security controls inputs into one or more of the features of the disclosure described in U.S. patent application Ser. No. 12/694,075. According to aspects of the disclosure, this Threat Rating may be a real number based on an algorithm that weighs an associate's activity. The Threat Rating may serve as a benchmark and starting point for analysts' investigation. Each associate's activity generates a Threat Rating output, which may be a focal point of one or more of the features of the disclosure described in U.S. patent application Ser. No. 12/694,075, and determination of what warrants extra attention. This Threat Rating number provides a succinct answer on questionable behavior that previously took associates long periods of time to create. According to aspects of the disclosure, outputs from the detection of the secure tunneling traffic may be incorporated into one or more of the features of the disclosure described in U.S. patent application Ser. No. 12/694,075 and, also, into the Threat Rating.

One or more aspects of the present disclosure described herein may be used in a variety of businesses or other organizations. For example, one or more aspects of the present disclosure described herein may be used by anyone who is concerned about the risks related to their employees (internally) using encrypted tunnels to avoid control and hide their proxy activity. Potential markets where one or more aspects of the present disclosure described herein may be applied include companies that are concerned with their data and take strides to protect and keep their data secure. In particular, companies with private or confidential information would benefit from the systems and methods described above. For example, financial institutions, investment banks, hedge funds, insurance companies, healthcare companies or hospitals, government agencies, credit card companies, and the like may benefit from the systems and methods described above.

It is noted that the system for detecting and analyzing secure tunneling may be an electronically based system. For example, the system may include a computer (such as described above), a network of computers, software that configures a computer to perform the above described features, and the like. The data may be electronically transmitted and received by the different elements of the system.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the features of the aforementioned illustrative examples may be utilized alone or in combination or subcombination with elements of the other examples. It will also be appreciated and understood that modifications may be made without departing from the true spirit and scope of the present invention. The description is thus to be regarded as illustrative instead of restrictive on the present invention.

The invention claimed is:

1. A computer assisted method for detecting encrypted tunneling comprising:
   electronically receiving information from a proxy server;
   extracting information regarding a CONNECT function of Hyper Text Transport Protocol (HTTP) from the electronically received information;
   determining at least one destination to which the extracted information regarding the CONNECT function of HTTP corresponds;
   attempting to negotiate a standard Hyper Text Transport Protocol Secure (HTTPS) session with each of the at least one destination; and
   for each of the at least one destination,
      determining if a Secure Socket Layer (SSL) certificate associated with the destination has been issued by a trusted certificate authority;
      determining whether the destination is hosting an encrypted tunneling application, wherein the determining is based on characteristics of the SSL certificate;
      in response to a determination that it is unable to be determined whether the destination is hosting an encrypted tunneling application based on characteristics of the SSL certificate, determining whether the destination is hosting an encrypted tunneling application based on characteristics of a response received from the destination over a transmission control protocol/Internet protocol (TCP/IP) connection; and
      generating a security alert in response to a determination that the destination is hosting an encrypted tunneling application.

2. The method according to claim 1, wherein the at least one destination is at least one Internet Protocol (IP) address or at least one IP address in combination with at least one port number.

3. The method according to claim 1, further comprising: determining if a destination, of the at least one destination to which the extracted information regarding the CONNECT function of HTTP corresponds, is a destination that has been previously identified by the method as a destination hosting an encrypted tunneling or proxy avoidance application by comparing the destination with a database of previously identified destinations.

4. The method according to claim 1, further comprising:
   for each destination of the at least one destination,
      comparing the destination with a database of previously identified destinations identified as hosting an encrypted tunneling application; and
      determining if the destination, is a previously identified destination.

5. The method according to claim 4, further comprising:
   upon determining the destination is hosting an encrypted tunneling application, recording the destination in a database of previously identified destinations identified as hosting an encrypted tunneling application.

6. The method according to claim 1, wherein the determining whether the destination is hosting an encrypted tunneling application includes determining whether the SSL certificate is self signed.

7. The method according to claim 1, wherein the determining whether the destination is hosting an encrypted tunneling application includes determining a name of a website associated with the SSL certificate.

8. The method according to claim 1, wherein the determining whether the destination is hosting an encrypted tunneling application based on characteristics of the response includes determining a service being operated at the destination.

9. The method according to claim 8, wherein the response received from the destination over the transmission control protocol/Internet protocol (TCP/IP) connection includes at least one of: capabilities of the service, a version of the service, and an operating system on which the service is running.

10. The method according to claim 1, wherein the determining whether the destination is hosting an encrypted tunneling application includes determining at least one of: a port or channel hopping patterns of a service being operated at the destination and a length of traffic of a service being operated at the destination.

11. The method according to claim 1, wherein the extracting information regarding a CONNECT function of HTTP from the electronically received information and the determining at least one destination to which the extracted information regarding the CONNECT function of HTTP corresponds occur immediately upon the electronically received information from the proxy server being received.

12. An encrypted tunneling detecting apparatus comprising:
   at least one processor; and
   at least one memory storing computer executable instructions that cause the at least one processor to perform a method for detecting encrypted tunneling comprising:
   electronically receiving information from a proxy server;
   extracting information regarding a CONNECT function of Hypertext Transfer Protocol (HTTP) from the electronically received information;
   determining at least one destination to which the extracted information regarding the CONNECT function of HTTP corresponds;
   attempting to negotiate a standard Hypertext Transfer Protocol Secure (HTTPS) session with each of the at least one destination; and
   for each of the at least one destination,
      determining if a Secure Socket Layer (SSL) certificate associated with the destination has been issued by a trusted certificate authority;

determining whether the destination is hosting an encrypted tunneling application, wherein the determining is based on characteristics of the SSL certificate or a response received from the destination over a Transmission Control Protocol/Internet Protocol (TCP/IP) connection;

in response to a determination that it is unable to be determined whether the destination is hosting an encrypted tunneling application based on characteristics of the SSL certificate, determining whether the destination is hosting an encrypted tunneling application based on characteristics of a response received from the destination over a TCP/IP connection; and generating a security alert in response to a determination that the destination is hosting an encrypted tunneling application.

13. The apparatus according to claim 12, further comprising: determining if a destination, of the at least one destination to which the extracted information regarding the CONNECT function of HTTP corresponds, is a destination that has been previously identified by the method as a destination hosting an encrypted tunneling or proxy avoidance application by comparing the destination with a database of previously identified destinations.

14. The apparatus according to claim 12, further comprising:

for each destination of the at least one destination,
comparing the destination with a database of previously identified destinations identified as hosting an encrypted tunneling application; and
determining if the destination, is a previously identified destination.

15. The apparatus according to claim 14, further comprising:

upon determining the destination is hosting an encrypted tunneling application, recording the destination in a database of previously identified destinations identified as hosting an encrypted tunneling application.

16. The apparatus according to claim 12, wherein the determining whether the destination is hosting an encrypted tunneling application includes determining whether the SSL certificate is self signed.

17. The apparatus according to claim 12, wherein the determining whether the destination is hosting an encrypted tunneling application based on characteristics of the response includes determining a service being operated at the destination.

* * * * *